Nov. 23, 1971          C. S. GLADOSKE          3,621,753
       DOUBLE TRUNNION ACCESSORY FOR MILLING MACHINES
Filed Sept. 11, 1969                           6 Sheets-Sheet 1
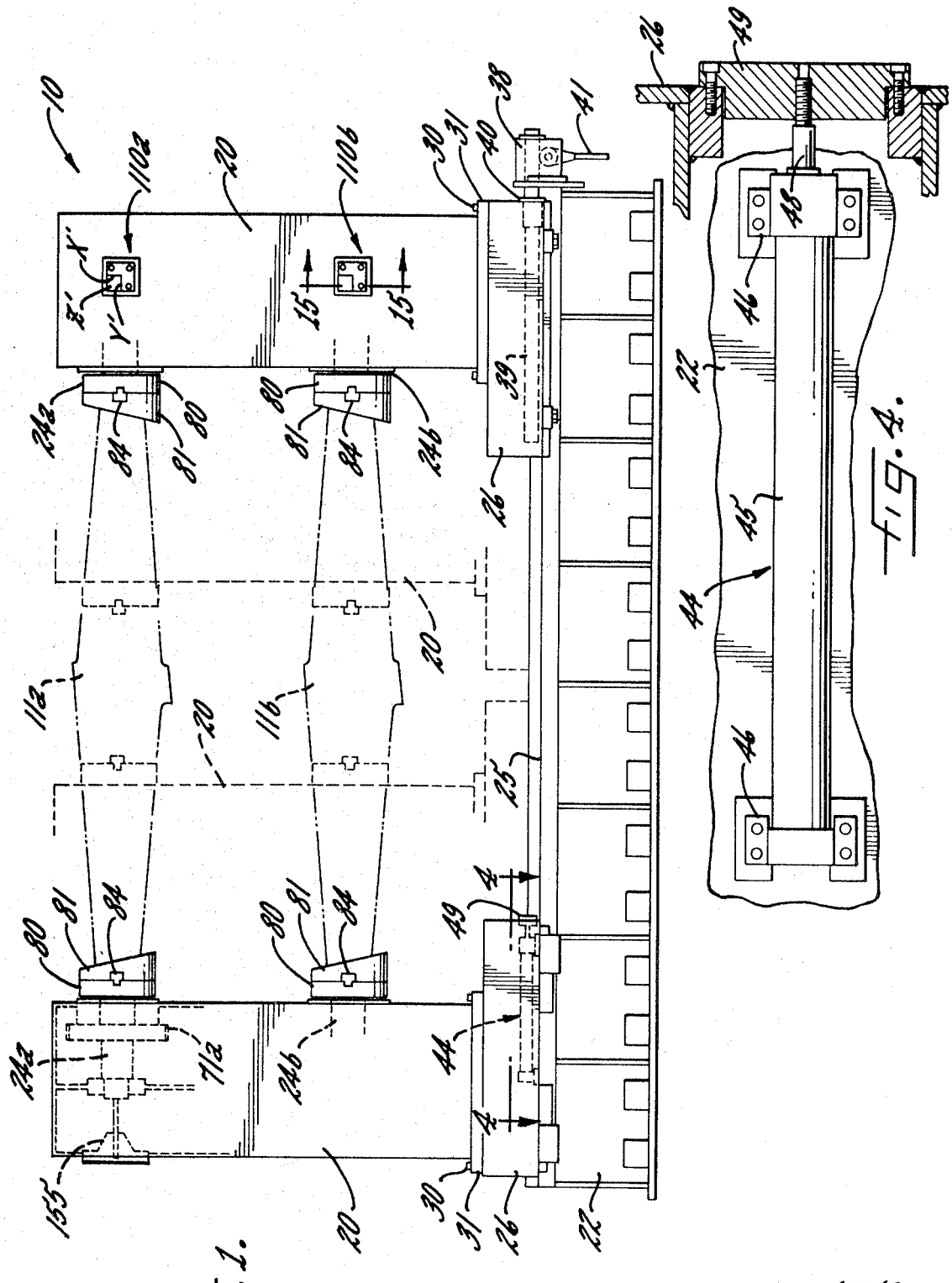
INVENTOR.
CALVIN S. GLADOSKE,
BY
Wolfe, Hubbard, Voit & Osann
ATTORNEYS.

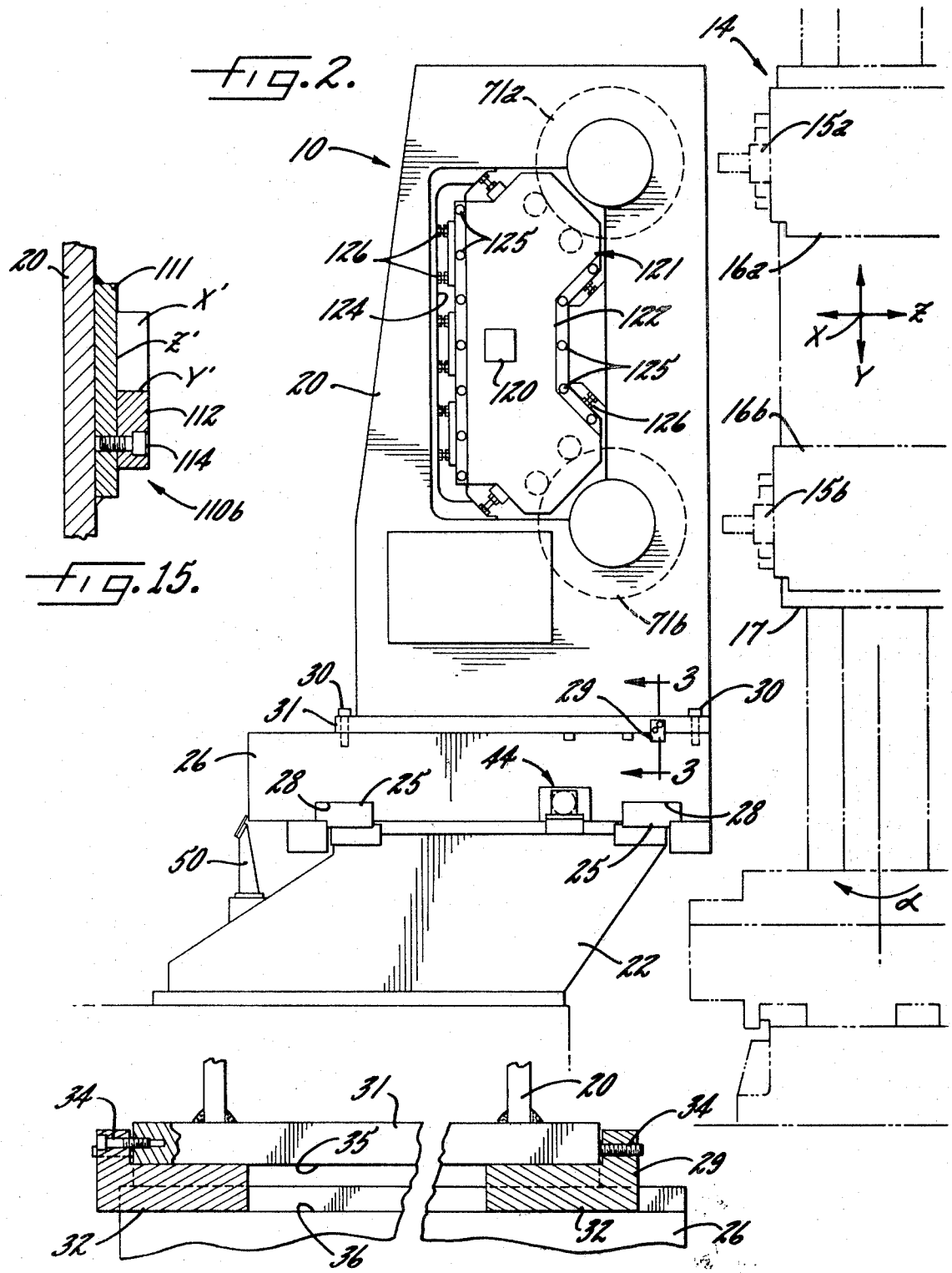

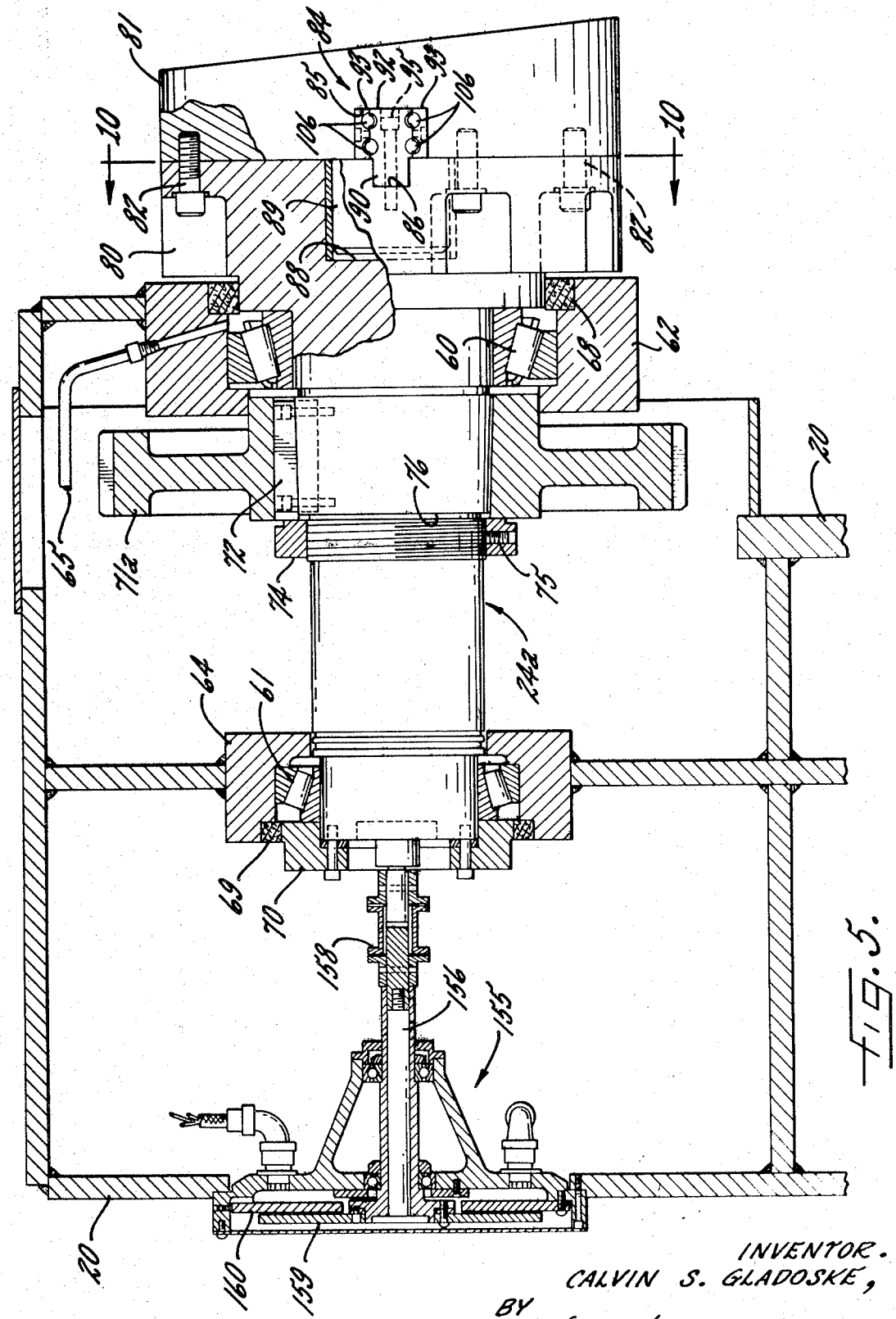

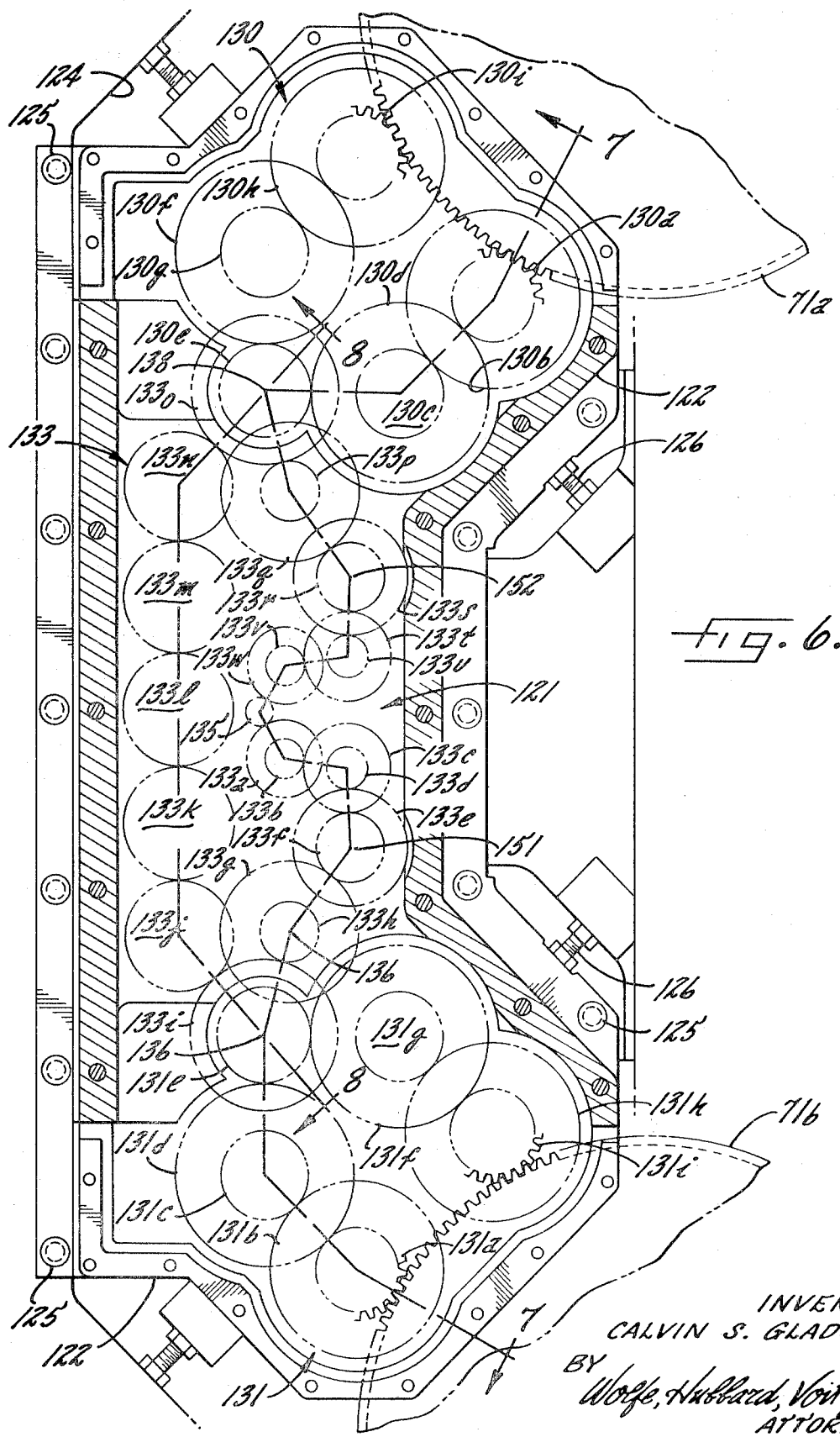

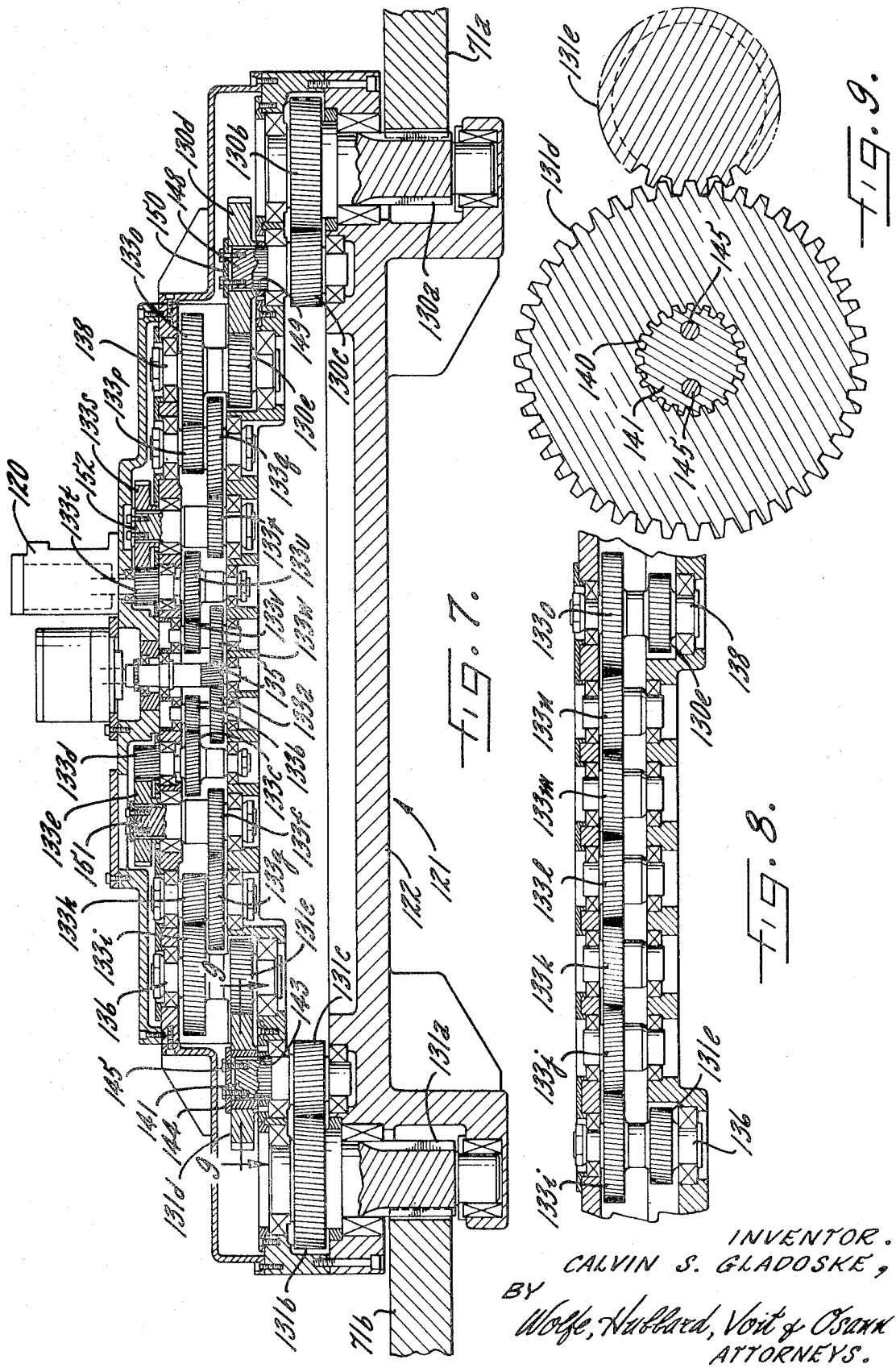

Nov. 23, 1971  C. S. GLADOSKE  3,621,753
DOUBLE TRUNNION ACCESSORY FOR MILLING MACHINES
Filed Sept. 11, 1969  6 Sheets-Sheet 6
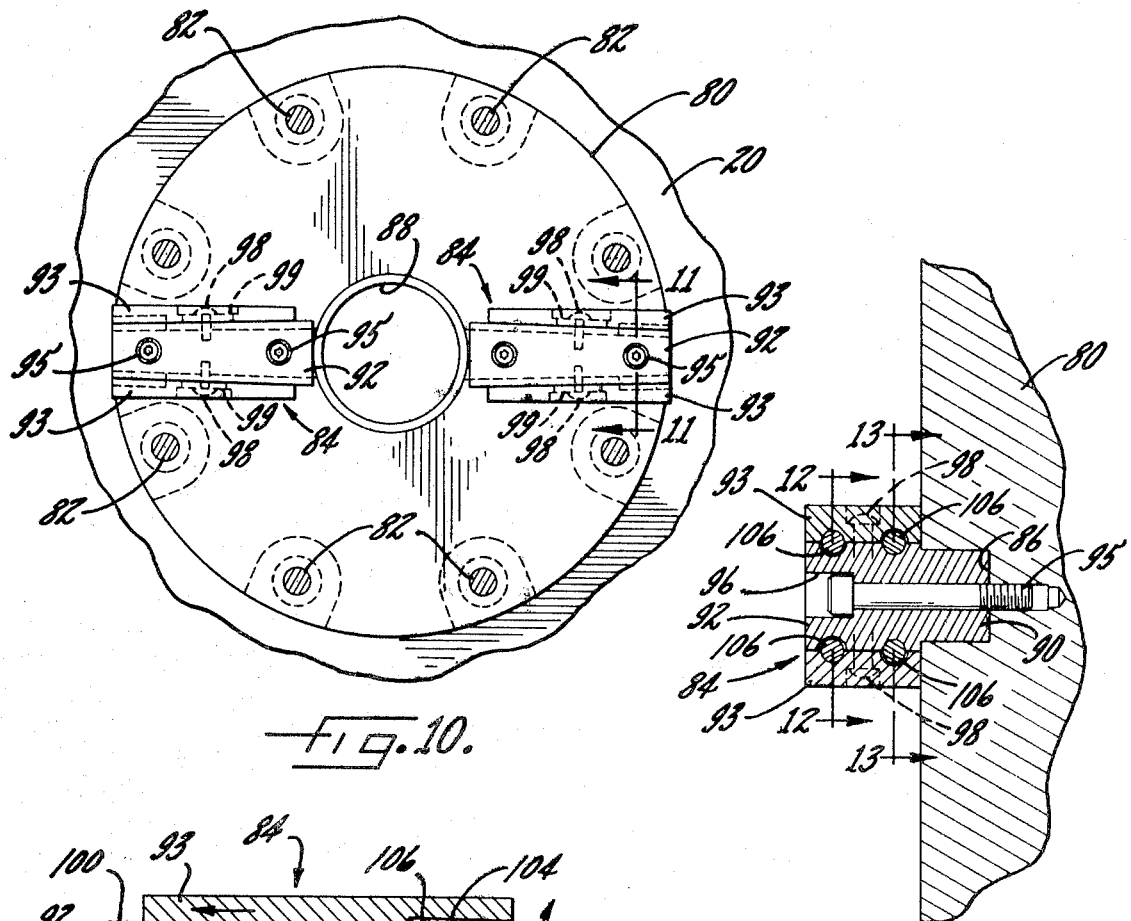
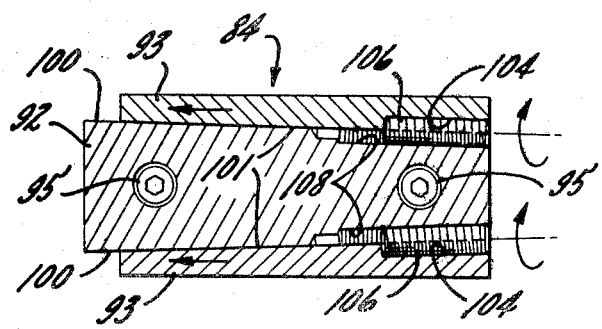
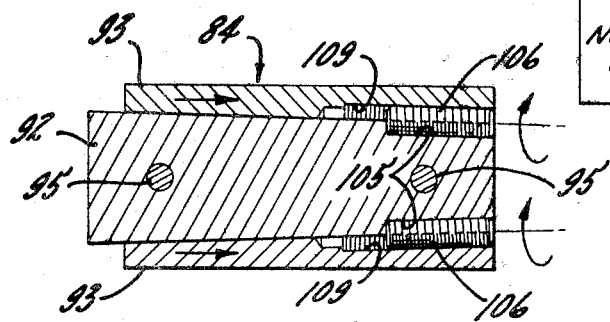
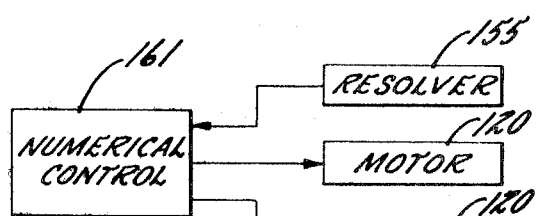
INVENTOR.
CALVIN S. GLADOSKE,
BY
Wolfe, Hubbard, Voit & Osann
ATTORNEYS.

United States Patent Office 3,621,753
Patented Nov. 23, 1971

3,621,753
DOUBLE TRUNNION ACCESSORY FOR
MILLING MACHINES
Calvin S. Gladoske, Fond du Lac, Wis., assignor to
Giddings & Lewis, Inc., Fond du Lac, Wis.
Filed Sept. 11, 1969, Ser. No. 857,160
Int. Cl. B23c 1/04, 3/04
U.S. Cl. 90—11 R       20 Claims

ABSTRACT OF THE DISCLOSURE

A machine tool work support having a pair of spaced columns each rotatably carrying a pair of work supporting trunnions. The trunnions of one column are in axial alignment with the trunnions of the other column so that work pieces may be suspended between the aligned trunnions for rotation therewith to present all sides of the work pieces about the axes of rotation to the machine tool. Each column has a servo motor which operates through a preloaded backlash free gear transmission to synchronously drive the trunnions of the respective column for precisely positioning the work pieces at a determined angular orientation and also for rotating the work pieces during a machining operation to provide an axis of motion in addition to the axes of motion of the machine tool.

DESCRIPTION OF THE INVENTION

The present invention relates generally to multiple axis milling machine tools and more particularly to an improved accessory for supporting a plurality of work pieces for such machines.

Some recently developed multiple axis milling machines have been provided with several vertically spaced spindles which may simultaneously machine a corresponding number of parts mounted on a common work surface. It has been proposed to provide a work fixture with a plurality of vertically spaced work support tables, each in a position confronting one of the machine spindles. Each table is mounted on a horizontal rotational axis so that the tables may be rotated in unison to properly position the work pieces for machining. Such a work fixture is illustrated in the Barnes U.S. Pat. No. 3,371,580.

In work holding fixtures such as that described above, since the parts are mounted on support tables, all sides of the part are not accessible for machining. Thus, multiple setups often are required to complete the machining of a part. Moreover, the drives for such work support tables often experience backlash which prevent accurate and uniform angular positioning of the tables, as well as prohibiting contour machining by rotation of the work pieces during the machining operation.

It is an object of the present invention to provide a work support structure for a multiple axis milling machine that is adapted to rotate a plurality of work pieces 360° to present all sides about the axis of rotation to the machine cutters in a single setup.

Another object is to provide a work support structure as characterized above that has an improved synchronous backlash free drive for precisely indexing a plurality of work pieces at a determined angular orientation and additionally for rotating the work pieces during the machining operation to provide an axis of motion in addition to those built into the machine tool. A related object is to provide a work support unit of the above kind in which the drive may be conveniently assembled and adjusted.

A further object is to provide a work support structure of the character set forth which reliably supports and secures a plurality of work pieces during machining and which insures correct angular relationship between the work pieces.

Other objects and advantages of the invention will become apparent upon reading the following detailed description and upon reference to the drawings, in which:

FIG. 1 is a front elevation view of an illustrative work support structure embodying the present invention with the support columns shown in solid lines at their maximum spread position supporting a long work piece and in phantom lines at an inwardly adjusted position supporting a shorter work piece;

FIG. 2 is a left side elevation view of the work support structure shown in FIG. 1 mounted adjacent a multiple spindle milling machine shown in phantom;

FIG. 3 is an enlarged fragmentary section taken in the plane of line 3—3 in FIG. 2;

FIG. 4 is an enlarged fragmentary section taken in the plane of line 4—4 in FIG. 1;

FIG. 5 is an enlarged fragmentary section of the upper left trunnion of the work support unit as shown in FIG. 1;

FIG. 6 is an enlarged partially schematic view of the drive included in each column of the illustrated work support structure;

FIG. 7 is a spread-out section of the drive shown in FIG. 6 taken in the plane of line 7—7;

FIG. 8 is a section of a portion of the drive unit shown in FIG. 6 taken in the plane of line 8—8;

FIG. 9 is an enlarged fragmentary section taken in the plane of line 9—9 of FIG. 7;

FIG. 10 is an end view of the work supporting trunnion taken in the plane of line 10—10 in FIG. 5;

FIG. 11 is an enlarged fragmentary section taken in the plane of line 11—11 in FIG. 10;

FIG. 12 is a section taken in the plane of line 12—12 in FIG. 11;

FIG. 13 is a section taken in the plane of line 13—13 in FIG. 11;

FIG. 14 is a simplified block diagram indicating the manner in which the work support structure illustrated in FIGS. 1–15 may be connected to a numerical control unit;

FIG. 15 is an enlarged fragmentary section taken in the plane of line 15—15 in FIG. 1.

While the invention is susceptible of various modifications and alternative constructions, certain illustrative embodiments thereof have been shown in the drawings and will be described below in detail. It should be understood, however, that there is no intention to limit the invention to the specific forms disclosed but, on the contrary, the intention is to cover all modifications, alternative constructions, and equivalents falling within the spirit and scope of the invention.

Referring more particularly to FIGS. 1 and 2 of the drawings, the invention is there embodied in an illustrative work support structure 10. The work support 10 in this case supports horizontally two work pieces 11a, 11b for machining by a multiple axis milling machine 14 shown in FIG. 2. The milling machine 14 has two vertically stacked horizontal spindles 15a, 15b housed in individual headstocks 16a, 16b, supported by a common saddle 17, at elevations corresponding to that of the work pieces. By means not shown in detail the spindle head stocks 16a, 16b may be moved along any of three mutually orthogonal axes, X, Y, and Z, and may be turned about the vertical axis α.

In accordance with the present invention the work support is adapted to simultaneously rotate the work pieces 360° to present all sides of the work pieces along their axes of rotation to the machine tool spindles, to precisely orient and support the work pieces in a determined angular position for machining, and to rotate the work pieces during a machining operation in synchronism with the motion of one or more of the milling machine axes. To this end, the work support unit 10 includes a pair of columns 20 slidably supported on an elongated runway 22 for relative horizontal movement. Each column 20 includes a pair of vertically spaced trunnions 24a, 24b supported for rotation therein about horizontal axes. The trunnions 24a, 24b of the left column 20, as viewed in FIG. 1, are in horizontal alignment with the corresponding trunnions of the right column so that the work pieces 11a, 11b may be suspended between corresponding trunnions and be rotated about parallel horizontal axes by rotation of the trunnions.

The elongated runway 22 is formed with a pair of upstanding guideways 25 disposed on the top surface thereof. The columns 20 are each supported on a saddle 26 which in turn is formed with a pair of guideways 28 for sliding engagement with the runway guideways 25 so as to permit horizontal movement of the saddles and columns along the runway. As shown in FIGS. 2 and 3, each column 20 is rigidly anchored to its respective saddle 26 by a key 29 and a series of hold-down screws 30 extending through a base plate 31 of the column 20 and threadably engaging the saddle 26. The key 29 is made up of two aligned L-shaped members 32 which embrace bottom and side portions of the base plate 31 and are secured thereto by threaded fasteners 34. One leg of each L-shaped key member 32 is disposed partially in a keyway 35 formed in the base plate 31 and partially in a saddle keyway 36. The key 29 thus ensures against lateral shearing of the screws 30 by forces exerted on the column during machining operations.

In order to provide adjustment of the horizontal distance between the columns 20 to accommodate work pieces 11a, 11b of different lengths, and to vary the lateral position of work pieces relative to a machine tool, means are provided for individually moving each column along the elongated runway 22. The right hand column 20 and the saddle 31 upon which it is mounted, as viewed in FIG. 1, are adjustable along the runway 22 by means of a manually operated worm drive unit 38 which includes a rotatable feed screw 39 meshing with a nut 40 fixed in the saddle 31. By turning a drive unit handle 41, the feed screw 39 is rotated and the nut 40 and column 20 are translated along the runway. The left hand column 20 is adapted to be adjusted on the runway by means of a power operated hydraulic cylinder 44. As shown in detail in FIG. 4, the hydraulic cylinder 44 includes a cylinder body 45 secured to the runway 22 by brackets 46 and a piston rod 48 anchored at its end to a plate 49 of the saddle 22. Operation of the hydraulic cylinder 45 to effect movement of the piston rod 48, saddle 22, and column 20 may be controlled by an appropriate manual control valve, not shown. Referring to FIG. 1, the columns may thereby be individually and selectively adjusted from a position of maximum separation as shown in solid lines for supporting long work pieces to a position of minimum separation shown in phantom lines for supporting shorter work pieces. In order to facilitate the positioning of the left hand column 20 at an exact predetermined position on the runway 22, a graduated scale index assembly 50 may be provided as shown in FIG. 2. A similar index device may be provided for the right column 20.

The trunnions 24a, 24b of each column are rotatably supported within the column 20 by a pair of preloaded bearings, such as the bearings 60 and 61 for the trunnion 24a. Since the illustrated trunnions 24a, 24b are substantially identical, only the trunnion 24a will be described in detail. Referring to FIG. 5, the trunnion bearings 60 and 61 are contained in respective hubs 62, 64 disposed within the column 20. Lubricating fluid may be supplied to each of the bearings by appropriate lines, such as line 65 leading to the forward bearing 60. To prevent the escape of lubricant to outside the column 20, an appropriate oil seal 68 is interposed between the hub 62 and trunnion 24a. A second oil seal 69 is interposed between the hub 64 and a plate 70 secured to the end of the trunnion to prevent the flow of lubricant from the bearing 61. To facilitate driving the trunnion 24a, 24b as will be described below, a bull gear 71a, 71b is fixed to the respective trunnion by a key 72. A lock nut 74 secured in place by a setscrew 75 maintains the bull gear in abutting position against a shoulder 76 of the trunnion.

In keeping with the invention, one end of each trunnion is provided with a work-supporting drive flange which includes drive keys that are adjustable to compensate for variation in the width of a keyway in a work holding fixture and to shift the axis of rotation of the workpiece relative to the trunnion axis if desired. In the illustrated embodiment as best shown in FIGS. 1, 5, and 10–13, each trunnion 24a, 24b is formed with a cylindrical flange 80 disposed outside the column 20 in opposing relation to the drive flange of the corresponding horizontally aligned trunnion in the other column. The work pieces 11a, 11b in this case are provided with a work holding fixture 81 at each end and may be supported between opposed trunnion flanges 80 by a series of bolts 82 passing through the flange 80 and threadably engaging the work holding fixture 81.

To insure an adequate driving connection between the drive flange 80 and the work holding fixture 81 without tending to shear the bolts 82 and additionally to facilitate mounting of the work pieces with the same angular orientation, each flange 80 is provided a pair of radially extending adjustable drive keys 84 adapted to engage radial keyways 85 in the work holding fixture 81. The illustrated keys 84 are T-shaped and are disposed in radial keyways 86 formed in the flange 80 on opposite sides of a counterbored central recess hole 88 which can receive a male extension 89 of a work holding fixture 81 as shown in FIG. 5. Each of the keys 84 includes a stem 90 which fits snugly in the flange keyway 86 and a head 92 that is provided with a pair of adjustable gibs 93. The keys 84 are rigidly screwed in the flange keyway 86 by screws 95, the heads of which are disposed in counterbores 96 formed in the key head. The gibs 93 each are slidably secured to the head 92 by a single screw 98 whose head is disposed below the outside surface of the gib in an elongated counterbore 99 formed in the gib. To permit adjustment in the width of the key 84 for slight variations in the width of the work holding fixture keyway 85, the head 92 and gibs 93 are formed with tapered mating surfaces 100 and 101, respectively. The slopes of the tapered surfaces are complementary so that the resulting key assembly is rectangularly shaped. Adjustment of the gibs 30 on the tapered head 92, however, will change the effective width of the key.

To effect movement of the gibs 93 with respect to the key head 92 in the illustrated embodiment, a pair of half-threaded holes 104, 105 each receiving a threaded screw member 106 are provided at the juncture of each gib and the head as best shown in FIGS. 11–13. One hole 104 between each gib 93 and key head 92 has a threaded portion 108 only in the gib half of the hole while the other hole 105 has a threaded portion 109 in the head half of the hole. It can be seen in FIG. 12 that by turning the screws 106 in the holes in a clockwise direction they advance along a threaded portion 108 forcing the gibs 93 along the tapered head in a direction which expands the width of the key 84. Referring to FIG. 13, when the screws 106 in the holes 105 are rotated in a clockwise direction the gibs 93 are forced in an opposite direction along the tapered head 92 to narrow the width of the key. The elongated counterbore 99 formed in each gib permits the gib to be moved with respect to the screw 98 which secures the gib to the head. It will be apparent to one skilled in the art that by appropriately adjusting the width of the keys 84 the axis of rotation of the workpiece may be shifted relative to the trunnion axis. It will also be appreciated that the keys 72 between the bull gears 71a, 71b and their respective trunnion may be of a type similar to the keys 84 to insure a reliable backlash free connection.

To assist in accurately positioning the machine tool spindles 15a, 15b and the workpieces 11a, 11b with respect to the work support unit 10, the right hand column 20 in this case is provided with reference blocks 110a, 110b adjacent the respective trunnions 24a, 24b. Each block 110a, 110b forms three mutually perpendicular surfaces X', Y', and Z' which may be used as references for precision movement and positioning in the X, Y, and Z planes. As shown in FIGS. 1 and 15, the illustrated reference blocks 110a, 110b each include an under plate 111 welded to the column 20 to form the surface Z' and a plate 112 secured to the underplate 111 by screws 114 and having a 90° notch forming the surfaces X' and Y'. The reference surface Y' lies in a horizontal plane, the height of which is equal to the rotary axis of the related trunnion. The surface X' lies in a plane which is perpendicular to the trunnion axes and is located a known distance from the outer work supporting face of the respective trunnion flange 84. The surface Z' lies in a vertical plane spaced a known distance from the axis of the related trunnion. Thus, it can be seen that the surface Z' may be readily used as a reference point for positioning the tool cutter a determined depth relative to the workpiece, while the surfaces X' and Y' may be conveniently referred to in positioning the workpiece fixture 81 relative to the trunnion.

In accordance with an important aspect of the present invention, the two trunnions of each column are driven in precise synchronism by a common servo drive motor which operates through a backlash-free gear transmission. The gear transmission is preloaded to substantially reduce backlash or lost motion attributable both to physical play between mating gears and to deflection of gear teeth, bearing mountings, and shaft windup, whereby accurate, positive positioning and rotational movement of the trunnions and workpieces is achieved. To this end, in the illustrated embodiment, the two trunnions 24a, 24b of each column 20 are driven by a single hydraulic servo motor 120 and a preloaded gear drive transmission 121 interconnects the motor 120 with the bull gears 71a, 71b carried coaxially by the respective trunnions 24a, 24b. Again, since the two illustrated columns 20 are substantially identical, including their drives, the drive for only one of the columns will be described in detail.

To provide a completely unitized drive assembly, the drive transmission 121 for each column is contoured within a separate housing 122. The transmission housing 122 is supported in a cavity 124 within the column 20 and is secured to the column by screws 125 and by adjustable stop jacks 126 interposed between the housing 122 and column 20. The gear drive transmission 121 in the present instance comprises three interconnected closed loop drive trains 130, 131, and 133 of helical gears, each drive train of which is provided with its own preload and backlash adjusting means as will be explained below. The drive train loop 130 includes gears 130a–i with the gears 130a and 130i engaging the bull gear 71a under a preloaded condition provided the closed loop. The gears 130a–d in this case are identical to the gears 130f–i so that the gear 130e is connected to the bull gear by two identical trains. The loop drive train 131 similarly includes gears 121a–i with the gears 131a and 131i engaging the bull gear 71b under a preloaded condition. The gears 131a–d again are similar to the gears 131f–i so that the gear 131e is connected to the bull gear 71b by two identical trains.

The closed loop gear train 133 comprising gears 133a–w in effect connects the gears 130e and 131e with an output pinion 135 of the servo motor 120. One leg of the loop 133 comprises identical gear trains 133a–i and 133o–w which both extend from the driving pinion 135. The gears 133i and 133o are mounted on respective shafts 136 and 138 coaxially with the gears 130e and 131e. The other leg of the loop 175 includes a train of gears 133j–n which closes the loop between the gears 133i and 133o. In the illustrated embodiment, the legs 133a–i and 133o–w of the loop 133 provide a significant reduction in speed between the output pinion 135 and the gears 133i and 133o.

The leg 133j–n of the loop 133 is merely an idler train connecting the gears 133i and 133o in a 1:1 relationship, the purpose of which is to close the loop 133 and maintain the backlash-free condition in the drive. It will be apparent that by appropriately designing trains 130, 131, and 133 a desired output trunnion speed may be achieved.

In preloading the looped gear trains 130, 131, and 133, the trains 130 and 131 preferably are loaded while the train 133 remains disengaged. The loop 133 may be disengaged by removing the gears 133o, 133e, and 133s. To facilitate preloading of the train 131 in the present instance at least one gear in the train, such as the gear 131d, has a splined connection 140 with the shaft 141 upon which it is mounted as shown in FIG. 9. The number of gear teeth in the gear 131d preferably has an odd relationship to the number of spline teeth the gear is formed with for the spline connection 140 so that during assembly the gear 131d can be located on the shaft 141 at an angular position which will effect simultaneous meshing of the helical gear teeth and spline teeth with their respective mating members. The gear 131d in this case has forty-four gear teeth, an even number, while having an odd number of twenty-one spline teeth. It will be understood that alternatively the spline could have an even number of teeth and the gear an odd number. Since the gear teeth are helical and the spline teeth are parallel to the shaft, when the gear 131d is pressed on to the shaft 141 in meshing engagement with the helical teeth of the mating gear 131e relative motion is caused between the gears 131d and 131e which has the effect of winding up or preloading the gear train 131 to remove any physical looseness between the mating gears. The preload applied to train 131 which may be determined by means of an appropriate torque measurement device should be sufficient to substantially eliminate lost motion or play in the train. Preloads of 50% of the capacity of the drive have been found to be satisfactory.

After the determined preload has been applied to the train 131 by pressing the gear 131d a determined distance on to the spline shaft 141, means are provided for securing the gear 131d in that position. In the present instance, a spacer 143 has been ground to fit the space between the gear 131d and the supporting shoulder of the shaft 141, and an end cap 144 attached to the end of the shaft by screws 145 secures the gear 131d in place. The gear train 130 may be similarly preloaded by applying one of the gears, such as the gear 130d, to a spline shaft 148 and providing an appropriately ground spacer 149 and end cap 150 to maintain the gear in proper position for the desired preload.

After the looped trains 130, 131 have been preloaded in assembling the drive transmission 121, the trunnions 24a, 24b should be rotated to bring the trunnion keyways 86 into precise angular alignment prior to preloading the connecting loop 133. One procedure that has been found desirable for completing the assembly of the drive is to lock or clamp the two trunnions of the column in their angularly aligned position and then assemble the gear 133o in meshing engagement with its mating gears 133m and p to complete the leg 133j-m of the loop 13. The top trunnion 24a may then be unclamped and the amount of backlash in the leg 133j-n can be determined by actual measurement of the physical angular movement of the top trunnion key way 86. The trunnion 24a may then be again locked in position with the keyway 86 oriented in an angular position that divides the backlash in half. The legs 133a-i and 133o-w may then be preloaded by pressing the gears 133e and 133r on the respective spline shafts 151 and 152 in meshing engagement with the helical gear teeth of the mating gears in a method similar to that described above. With their loop 133 completely assembled, the pair of trunnions in the column 20 may be released. In view of the above it can be seen that the preloading of each gear train loop may be readily adjusted by removing the end cap securing the helical gear on the spline shaft and changing the spacer which controls the axial position of the gear. It will be appreciated, however, that other methods and means may be used for preloading the drive transmission 121.

In operation, the two trunnions 24a, 24b of each column 20, and thus the work pieces supported between the trunnions, may be rotated in precise synchronism by the respective servo motors 120 which may be controlled by a split command signal originating from a numerical control system of a known type. The work supporting trunnions of the present invention allow all sides of a work piece to be indexed to the machine tool, and the backlash procedure additionally permits precision rotation of the work piece under servo control during the machining operation to provide an axis of motion in addition to those built into the machine.

In order to indicate the position of the trunnions and control their angular orientation with a high degree of accuracy, a feed back means is provided at one of the trunnions. In the illustrated embodiment, a rotary position feed back resolver assembly 155 is provided at the end of the upper left trunnion 24a as viewed in FIG. 1. Such a resolver assembly may be of the type widely sold under the name Inductosyn and need not be described in detail. Basically, referring to FIG. 5, the resolver assembly 155 includes a shaft 156 that is connected by an appropriate coupling 158 to the trunnion 24a for rotation with the trunnion. A radial scale plate 159 is secured at the end of the shaft 156 immediately adjacent a stationary sensor plate 160. When the trunnion 24a is rotated crossing the scale plate 159 to be moved relative to the stationary sensor plate 160, an electrical signal is produced whose phase shifts by an amount which is representative of the amount of relative movement between the plates 159 and 160. In practice, as indicated in FIG. 14, the feed back signals generated by the resolver 155 are applied to the numerical control 161 which in response thereto produces servo command signals which are then applied to the two servo motors 20 of the respective columns. Thus, by means of the rotary resolvers an accurate indication of the angular orientation of the trunnions is given at all times, allowing accurate positioning and orientation of the trunnions by the numerical control unit.

It will be appreciated that it is not essential that the keyways of opposed axially aligned trunnions be in precise angular alignment, as are the trunnions supported in the same column. When short work pieces are to be machined, such as shown in phantom in FIG. 1, it often is suitable to provide a key connection between only one trunnion and work holding fixture for each work piece. The other end of the work holding fixture may be adequately secured to its supporting trunnons by the bolted connection. On the other hand, if long slender work pieces are to be machined, as also illustrated in FIG. 1, it may be desirable to have a key connection with the work holding fixtures at both ends of the suspended work piece to prevent excessive torsional forces on the work piece during machining. In the latter case, the work holding fixture of one trunnion may be angularly adjusted to compensate for any angular misalignment of the keyways in the opposed trunnions.

From the foregoing, it may be seen that there has been provided a work support which may be readily employed as an accessory to a multiple axis milling machine and is adapted to rotate a plurality of work pieces 360° to present all sides about the axis of rotation to the machine cutters in a single setup. The work support has an improved synchronous backlash-free drive for precisely positioning the work pieces at a determined angular orientation and additionally for rotating the work pieces about the same axis during the machining operation for precision contour milling of the pieces.

While the invention has been illustrated in the drawings in connection with one particular embodiment, it will be understood that various modifications may be made within the scope of the invention. For example, if for some reason it is desired to use a machine with a head stock having a horizontally arranged array of spindles, the invention could be used by mounting the trunnions so that they swivel about vertical axes. Thus, the trunnions could be mounted on laterally spaced, vertically extending rotational axes, and correspondingly, the columns would be horizontally positioned.

I claim as my invention:

1. A work support apparatus for a multiple axis machine tool comprising, in combination, a runway, a pair of spaced support columns adjustably positionable on said runway, a trunnion rotatably supported by each said column, said trunnion of one column being in axial alignment with the trunnion of the other column, said trunnions each having a drive flange at one end thereof outboard of said column, said drive flanges being in opposing relationship, a work holding fixture having an external keyway secured at opposite ends of said work piece, fastening means for securing one of said work holding fixtures to each of said drive flanges to suspend said work piece between said trunnions for machining by said machine tool, and at least one of said drive flanges including a drive key that is adjustable to snugly engage the keyway of the work holding fixtures secured to said flange, and drive means for rotatably driving at least one of said trunnions so that the workpiece supported by said trunnions may be selectively rotated to present all sides of said work piece about its axis of rotation to said machine tool for machining.

2. The work support apparatus of claim 1 in which each said drive flange is formed with a keyway, said adjustable key being secured in said flange keyway and having a head portion extending out from said flange, movable gibs adjustably secured to opposite sides of said key head, said gibs and head each having tapered mating surfaces, and means for moving said gibs along said tapered head surfaces to selectively change the width of said key.

3. The work support apparatus of claim 1 including means for selectively and individually positioning said columns along said runway to accommodate different sized work pieces between said trunnions and to laterally position the work pieces with respect to said machine tool.

4. The work support apparatus of claim 1 in which at least one of said columns is formed with three mutually perpendicular surfaces adjacent each trunnion which may be referred to in accurately positioning said machine tool and work piece relative to said work support apparatus.

5. The work support apparatus of claim 4 in which one said reference surface is perpendicular to the axis of the respective trunnion and is located a determined distance from the work holding end of said trunnion, a second said surface lies in a horizontal plane passing through the axis of the respective trunnion, and said third surface lies in a vertical plane spaced a determined distance from the axis of said trunnion.

6. A work support apparatus for a machine tool comprising, in combination, an elongated runway, a pair of spaced support columns adjustably positionable on said runway, said columns each rotatably carrying a plurality of work supporting trunnions for rotation about individual parallel axes, said trunnions of one column being in axial alignment with the trunnions of the other column, means for securing and supporting work pieces between axially aligned trunnions for machining by said machine tool, drive means including a servo motor associated with one of said columns for rotatably driving in synchronism the trunnions of said column so that work pieces supported by said trunnions may be rotated 360° in synchronism to present all sides of said work pieces about their axes of rotation to said machine tool for machining, and a preloaded gear drive transmission operatively connecting said servo motor with the trunnions of said column.

7. The work support apparatus of claim 6 in which said drive means includes a servo motor associated with each column, and a preloaded gear drive transmission operatively connecting each servo motor with the trunnions of the respective column.

8. The work support apparatus of claim 7 in which each said trunnion includes a drive flange at one end thereof, said drive flanges of axially aligned trunnions being in opposed relation, and means for securing said work pieces to said opposing drive flanges to suspend said work pieces between said trunnions.

9. The work support apparatus of claim 6 in which said gear drive transmission is contained in a separate unitized housing, and said transmission housing is supported and secured within its respective column.

10. A work support apparatus for a multiple spindle machine tool comprising, in combination, an elongated runway, a pair of spaced support columns adjustably positionable on said runway, said columns each supporting a pair of work supporting trunnions for rotation about individual parallel axes distributed in a common vertical plane, said trunnions of one column being in axial alignment with the trunnions of the other column, means for securing and suspending work pieces between axially aligned trunnions for machining by said machine tool, a servo drive motor associated with one of said columns, a preloaded gear drive transmission interconnecting said servo motor with the trunnions of the respective column, and said servo motor and drive transmission being operable to rotably drive in synchronism the trunnions of the respective column and the work pieces supported by the trunnions to selectively present various surfaces of the work pieces for machining by said machine tool.

11. The work support apparatus of claim 10 in which said drive transmission includes three interconnected gear trains, one said train being in engagement with said servo motor, the second and third trains each connecting said first train with one of said trunnions, and means for individually preloading each said train to reduce backlash attributable to physical play and deflection between mating gears.

12. The work support apparatus of claim 10 in which said trunnions each carry a bull gear and said servo motor has an output pinion, said drive transmission including three interconnected closed loop gear trains, one said train engaging the output pinion of said servo motor, the second and third trains each interconnecting the first train with one of said bull gears, and said trains each having a determined preload to reduce lost motion between mating gears during operation of said transmission.

13. The work support apparatus of claim 12 in which said first loop train of said gear transmission has one leg comprised of two identical speed reducing gear trains each extending from the servo motor output pinion, and another leg in the form of an idler gear train connecting the low speed ends of said two speed reducing trains to close said first loop.

14. The work support apparatus of claim 13 in which said second and third trains of said drive transmission include two identical legs connecting one of said low speed ends of said first train to the respective bull gear.

15. The work support apparatus of claim 12 in which each said loop gear train includes helical gears and at least one said helical gear in each train has a spline connection with a shaft upon which it is mounted so that axially positioning of said gear on said spline shaft while in meshing engagement with a mating helical gear in said train creates relative motion between said gears and preloading of said train, and means for securing each said gear on said spline shaft at a desired axial position to maintain a determined preloading of said train.

16. The work support apparatus of claim 15 in which the number of gear teeth of each spline mounted helical gear has an odd relation to the number of gear spline teeth in said spline connection.

17. The work support apparatus of claim 15 in which each said spline shaft is formed with a shoulder, and each said gear securing means includes a spacer of predetermined thickness axially interposed between said gear and said shoulder of the spline shaft upon which the gear is mounted, and an end cap securing said gear in position against said spacer.

18. The work support apparatus of claim 10 in which a servo drive motor is associated with each of said columns, and a pre-loaded gear drive transmission operatively connects each servo motor with the trunnions of the respective column.

19. The work support apparatus of claim 10 including means for producing a feed back signal for indicating the angular orientation of at least one of said trunnions, a numerically controlled system for producing servo command signals in response to feed back signals, means for applying said position feed back signals to said numerical control, and means for applying the servo command signals produced by said numerical control to said servo drive motors to synchronously drive the respective trunnions.

20. The work support apparatus of claim 19 in which said feed back signal producing means is a rotary positioned feed back resolver assembly mounted at the end of one of said trunnions, said resolver assembly including a stationary element mounted on the column supporting said trunnion, and a movable element connected to said trunnion for rotation therewith opposite said stationary element.

References Cited

UNITED STATES PATENTS

| 334,647   | 1/1886 | Dayton      | 82—8    |
| 2,558,055 | 6/1951 | Meredith    | 279—1 DC |
| 3,371,580 | 3/1968 | Barnes et al. | 90—11 |
| 3,498,006 | 3/1970 | Lang et al. | 51—237  |

GIL WEIDENFELD, Primary Examiner

U.S. Cl. X.R.

90—20; 82—3, 9; 269—43; 279—1 DC